United States Patent
Greenstein

(10) Patent No.: US 10,623,356 B2
(45) Date of Patent: Apr. 14, 2020

(54) SYSTEM AND METHOD FOR PROCESSING INCOMING EMAILS

(71) Applicant: Blanca Perper Greenstein, Wellington, FL (US)

(72) Inventor: Blanca Perper Greenstein, Wellington, FL (US)

(*) Notice: Subject to any disclaimer, the term of this patent is extended or adjusted under 35 U.S.C. 154(b) by 804 days.

(21) Appl. No.: 14/684,652

(22) Filed: Apr. 13, 2015

(65) Prior Publication Data
US 2015/0295871 A1 Oct. 15, 2015

Related U.S. Application Data

(60) Provisional application No. 61/979,756, filed on Apr. 15, 2014.

(51) Int. Cl.
*G06F 15/16* (2006.01)
*H04L 12/58* (2006.01)
*G06Q 10/10* (2012.01)

(52) U.S. Cl.
CPC .......... *H04L 51/14* (2013.01); *G06Q 10/107* (2013.01); *H04L 51/16* (2013.01); *H04L 51/34* (2013.01)

(58) Field of Classification Search
CPC .......... H04L 51/14; H04L 51/34; H04L 51/16
USPC .................................. 709/206, 207, 214
See application file for complete search history.

(56) References Cited

U.S. PATENT DOCUMENTS

| | | | |
|---|---|---|---|
| 5,765,033 A | 6/1998 | Miloslavsky | |
| 6,282,565 B1* | 8/2001 | Shaw | G06Q 10/107 709/200 |
| 6,941,304 B2* | 9/2005 | Gainey | G06Q 10/107 |
| 7,092,509 B1 | 8/2006 | Mears et al. | |
| 7,254,641 B2 | 8/2007 | Broughton et al. | |
| 8,316,092 B2 | 11/2012 | Bowie et al. | |
| 8,503,663 B2 | 8/2013 | Mewhinney et al. | |
| 8,644,487 B2 | 2/2014 | Erhart et al. | |
| 8,644,490 B2 | 2/2014 | Stewart | |
| 8,670,550 B2 | 3/2014 | Flockhart et al. | |
| 2006/0053199 A1* | 3/2006 | Pricken | G06Q 10/107 709/206 |
| 2009/0181642 A1* | 7/2009 | Bekanich | G06Q 10/109 455/406 |
| 2013/0006986 A1 | 1/2013 | Phan et al. | |
| 2014/0016766 A1 | 1/2014 | Strandberg | |
| 2015/0088997 A1* | 3/2015 | van Dijk | G06Q 10/10 709/206 |

(Continued)

*Primary Examiner* — Ario Etienne
*Assistant Examiner* — Sahera Halim
(74) *Attorney, Agent, or Firm* — Scott D. Smiley; Scott M. Garrett; The Concept Law Group, PA

(57) ABSTRACT

A method for processing email is disclosed. The method includes receiving a first email via an email system and storing the first email in a database system communicatively coupled to the email system. The first email is assigned to a first one of a plurality of email queues, each of the plurality of email queues associated with at least one designated user-recipient, the designated user-recipient having a skill set suitable for processing emails within the associated email queue. The first email is subsequently assigned to a second one of the plurality of email queues and an email history of the first email is displayed, the email history describing sequential assignments of the first email to the plurality of email queues and including historical data in a chronological order.

20 Claims, 10 Drawing Sheets

(56) References Cited

U.S. PATENT DOCUMENTS

2017/0134330 A1* 5/2017 Clark .................... H04L 51/26
2017/0155729 A1* 6/2017 Kizhakkiniyil ..... H04L 67/2819

* cited by examiner

400

History

Add Comment

03/24/2014 16:06 Re-Assigned By Samantha Acosta

Assigned To Regular

03/24/2014 16:05 New Documents Assigned By Samantha Acosta

New documents assigned to this matter

03/14/2014 20:56 Re-Assigned By Asiel Lara

Assigned To Regular

03/14/2014 20:55 New Documents Assigned By Asiel Lara

New documents assigned to this matter

600
FIG. 6

SYSTEM AND METHOD FOR PROCESSING INCOMING EMAILS

CROSS-REFERENCE TO RELATED APPLICATION

This application claims priority to U.S. Provisional Patent Application No. 61/979,756 filed Apr. 15, 2014, the entirety of which is incorporated by reference.

FIELD OF THE INVENTION

The present invention relates generally to email processing, and more particularly relates to a system and method for efficient and transparent processing of emails received into a centralized inbox and distributed to a plurality of queues.

BACKGROUND OF THE INVENTION

Electronic mail messages, i.e., email, are becoming a preferred method of communication in business today. Companies with a large number of employees often have difficulty processing a large volume of incoming emails in an efficient and transparent manner. In particular, current systems and methods of processing emails are limited and impossible to track. For example, incoming emails may be sent to an incorrect employee email account, which may require forwarding the email message to the correct employee email account. Subsequently, processing of the email may require forwarding the email to more than one department that may perform various, distinct activities associated with the email. This method of forwarding emails to various users' inboxes does not allow other system users to track the location of the email or quickly determine whether the email has been processed properly.

For example, within a law firm, a potential client may email an attorney with legal questions. Subsequently, the attorney may forward the email to a legal assistant that may schedule an initial consultation. Thereafter, a legal secretary may be responsible for booking a conference room in accordance with the scheduled consultation, sending a confirmation email to the potential client, and placing the consultation time, date and meeting location on the attorney's calendar. Current email systems do not provide the attorney with a simple way to verify that the potential client was processed promptly and correctly throughout the initial intake process.

As another example, a client may email an attorney inquiring about docketing deadlines or invoices, which, in many current email systems, would require forwarding the email to a paralegal or an accounting department. Accordingly, it may be difficult for a supervising entity to determine at what stage in a company process a matter associated with the email is currently at, and whether the matter was promptly attended to and resolved. Current email processing systems do not provide an efficient system for properly assigning emails to a single individual, and/or tracking the life of an email as it is handled and responded to by one or more individuals within a company according to a company process.

Current email systems do not provide a method that allows supervising entities to distribute the receipt and handling of emails evenly to employees that are qualified to handle such emails so that any single individual is not overloaded with an undue share of the emails. Additionally, current email systems do not provide the capability to analyze the efficiency of employee email processing in order to improve productivity and identify areas that require improvement. Even where some companies have developed an efficient internal process for handling various types of emails, current email systems provide limited functionality, which does not allow such companies to implement these internal processes in an efficient manner.

Therefore, a need exists to overcome the problems with the prior art as discussed above.

SUMMARY OF THE INVENTION

The invention provides a system and method for processing incoming emails that overcomes the hereinafore-mentioned disadvantages of the heretofore-known devices and methods of this general type and that provides an efficient, transparent, and customizable email system that handles incoming emails.

With the foregoing and other objects in view, there is provided, in accordance with the invention, a computer-implemented method for processing email, the method including receiving a first email via an email system; storing the first email in a database system communicatively coupled to the email system; and assigning the first email to a first email queue of a plurality of email queues, each of the plurality of email queues associated with at least one designated user-recipient, the designated user-recipient having a skill set suitable for processing emails within the associated email queue. The email system stores a first historical data and associates the first historical data with the assignment of the first email to the first email queue. The first historical data includes an identification of a designated user-recipient associated with the assignment to the first email queue. After assigning the first email to the first email queue, the email system assigns the first email to a second email queue of the plurality of email queues. The email system stores a second historical data and associates the second historical data with the assignment of the first email to the second email queue. The second historical data includes an identification of a designated user-recipient associated with the assignment to the second email queue. An email history of the first email is displayed, the email history describing sequential assignments to the plurality of email queues and including the first and second historical data presented in a chronological order.

In accordance with another feature of the present invention, assignment of the first email to the first and the second email queue is performed according to a predetermined email process flow.

In accordance with yet another feature of the present invention, the predetermined email process flow includes a set of customizable rules created by an email system administrator.

In accordance with another feature of the present invention, the first email is received into a centralized inbox communicatively coupled to the email system.

In accordance with a further feature of the present invention, the first email is assigned to the second email queue by the designated user-recipient associated with the first email queue.

In accordance with yet a further feature of the present invention, a time interval is determined, the time interval defined by an amount of time that a designated user-recipient actively processes the first email and associates the time interval with said designated user-recipient and the first email. Said time interval is used to generate a bill for processing the first email, the bill includes the time interval and an identification code identifying a matter associated with the first email.

In accordance with another feature of the present invention, the database system is operatively configured such that the first email is not deleteable by an email system user.

In accordance with another feature of the present invention, the first email is selectively re-assigned to an alternate designated user-recipient in response to an absence of an assigned designated user-recipient.

In accordance with yet another feature of the present invention, the first email is associated with a unique subject matter identifier; and a second email is received and associated with the unique subject matter identifier, both the first and second email accessible by an email system user who is not a user-recipient of either of the first or the second email via the unique subject matter identifier and without being forwarded the first and the second emails.

In accordance with another feature, an embodiment of the present invention includes a non-transitory computer-readable medium with instructions stored thereon, that when executed by a processor, performs the steps of receiving a first email via an email system; storing the first email in a database system communicatively coupled to the email system; and assigning the first email to a first email queue of a plurality of email queues, each of the plurality of email queues associated with at least one designated user-recipient, the designated user-recipient having a skill set suitable for processing emails within the associated email queue. Further, the instructions includes instructions for performing the steps of storing a first historical data and associating the first historical data with the assignment of the first email to the first email queue, the first historical data including an identification of a designated user-recipient associated with the assignment to the first email queue; after assigning the first email to the first email queue, assigning the first email to a second email queue of the plurality of email queues; storing a second historical data and associating the second historical data with the assignment of the first email to the second email queue, the second historical data including an identification of a designated user-recipient associated with the assignment to the second email queue; and in response to a user request, displaying an email history of the first email, the email history describing sequential assignments to the plurality of email queues and including the first and second historical data in a chronological order.

In accordance with a further feature, an embodiment of the present invention includes a system for processing email, the system including a centralized inbox communicatively coupled to an email system, the centralized inbox operably configured to receive a first email; a database system communicatively coupled to the email system, the database system operably configured to store the first email; and a processor communicatively coupled to the email system. The processor is operable to assign the first email to a first email queue of a plurality of email queues, each of the plurality of email queues associated with at least one designated user-recipient, the designated user-recipient having a skill set suitable for processing emails within the associated email queue; store a first historical data and associate the first historical data with the assignment of the first email to the first email queue, the first historical data including an identification of a designated user-recipient associated with the assignment to the first email queue; and after assigning the first email to the first email queue, assign the first email to a second email queue of the plurality of email queues. The processor is further operable to store a second historical data and associate the second historical data with the assignment of the first email to the second email queue, the second historical data including an identification of a designated user-recipient associated with the assignment to the second email queue; and in response to a user request, display an email history of the first email, the email history describing sequential assignments to the plurality of email queues and including the first and second historical data in a chronological order.

Although the invention is illustrated and described herein as embodied in a system and method for processing incoming emails, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 6 is screenshot of the exemplary software application of FIG. 4 depicting a user interface displaying a log of a single email's history in accordance with an embodiment of the present invention;

DETAILED DESCRIPTION

Figure 1:
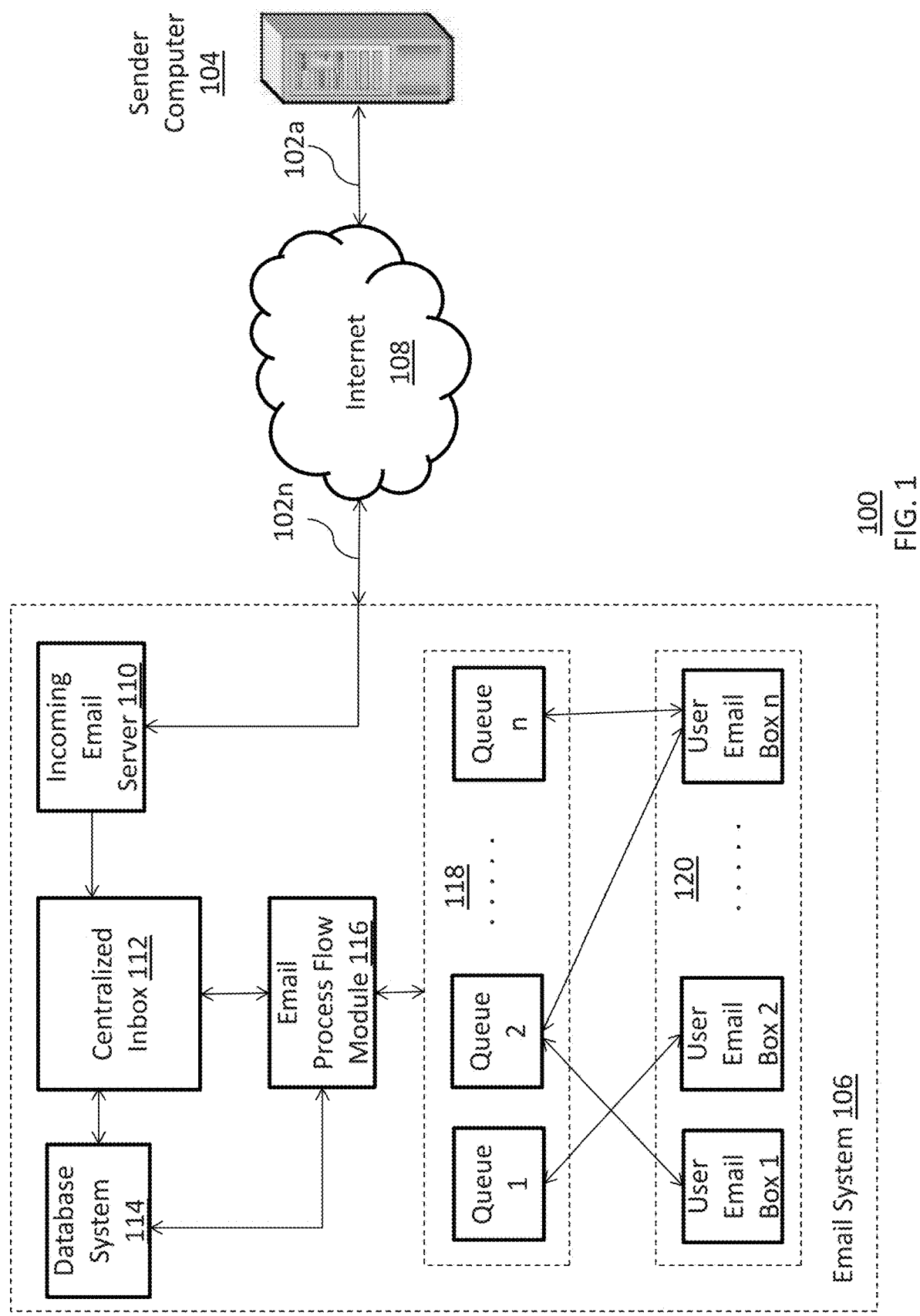
FIG. 1 is a block diagram of an exemplary distributed data processing network with a sender computer and an email system in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient system and method for processing incoming emails into an email system with a multitude of email accounts/users within a single domain. Embodiments of the invention provide a centralized inbox that receives all incoming emails. In addition, embodiments of the invention provide a user-customizable process flow module that can restrict the flow of email assignments according to user-specified process flow rules. In some embodiments, the email system includes a plurality of email queues that can be divided according to, for example, user and/or subject matter. In further embodiments, one or more users can be associated with each email queue and only users associated with an email queue can receive, respond, and/or otherwise process the emails within the queue. In yet further embodiments, users can perform an action on an email and then assign and/or re-assign the email to another user or queue for further processing. In another embodiment, historical data describing date, time, and user assignment can be associated with the email so that users can quickly view a chronological history of the life of the email throughout the email system as the email is assigned, acted on, and re-assigned to different users and queues. In yet another embodiment, a timer can be associated with the email, such that a user is able to record the amount of time it took the user to respond to or otherwise act on the email. In yet a further embodiment, the email system is configured to extract data, analyze data, and generate reports on, for example, time frames for responding to emails, efficiency of email processing, employee production, and the like.

Referring now to FIG. 1, one embodiment of the present invention is shown in a block diagram view. FIG. 1 shows several advantageous features of the present invention, but, as will be described below, the invention can be provided in several shapes, sizes, combinations of features and components, and varying numbers and functions of the components. The first example of a network 100 of data processing systems in which the present invention may be implemented, as shown in FIG. 1, includes connections 102a-n, which are the medium used to provide communications links between various devices and computers connected together within the network 100. As used herein, "a" is intended to indicate 1 and "n" can be any number greater than 1. The connections 102a-n may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted examples, the network 100 includes a sender computer 104 and an email system 106. It is understood that there can be any number of sender computers 104, which may send emails to the email system 106 and receive response emails from the email system 106 via a network, such as the Internet 108. The Internet 108 represents a worldwide collection of networks and gateways that use the TCP/IP suite of protocols to communicate with one another. At the heart of the Internet 108 is a backbone of high-speed data communication lines between major nodes or host computers, consisting of thousands of commercial, government, educational and other computer systems that route data and messages. Of course, the network 100 also may be implemented as a number of different types of networks, such as for example, an Intranet, a local area network (LAN), or a wide area network (WAN). FIG. 1 is intended as an example, and not as an architectural limitation for the present invention.

The sender computer 104 can be considered an email terminal that allows users to send emails over a network, such as the Internet 108. The sender computer 104 can be, for example, a personal computer (PC), a computer tablet, a smart phone or other mobile electronic device, and the like, operable to connect to email servers over the Internet 108. In one embodiment, the sender computer 104 runs an email client that enables computers to receive and send emails to other email clients via an email server that routes emails. In a preferred embodiment, the sender computer 104 includes a network interface card that facilitates communication of the sender computer 104 with devices, components, servers, particularly email servers, etc. over the Internet 108.

In one embodiment, the email system 106 includes an incoming email server 110 that receives all incoming emails, a queue system 118 including a plurality of email queues, and a user email box system 120, where the number of queues and boxes between "1" and "n" can be any number. In one embodiment, the incoming email server 110 routes all incoming emails to a centralized inbox 112. Stated another way, any email account can be linked to the email system 106 so that all incoming emails for the email account are received into the centralized inbox 122 for processing by the email system 106 in accordance with the present invention. As an example, in one embodiment, an email box associated with the address legalmail@abc.com is linked to the email system 106 so that all emails sent to legalmail@abc.com are received by the email system 106 where they can be organized, formatted as nondeletable emails, disbursed to a plurality of queues, and chronologies created and saved as the emails move from one queue to the next. In another embodiment, the centralized inbox 112 is a memory storage location within the email system 106 dedicated to receiving and/or storing all incoming emails. In yet another embodiment, the incoming email server 110 routes some emails directly to an addressee user email box, without being processed through the queue system 118, whereas the remaining emails are routed through the queue system 118 and the centralized inbox 112. For example, the email system 106 can be configured such that a portion of the user email boxes 120, which may have been specified by an email administrator, are to receive emails directly, without being processed through the queue system 118. Such specified user email boxes 120 may be associated with users that require confidentiality of communications and the like. In yet another embodiment, the email system 106 can be configured such that, by default, email is routed by the incoming email server 110 directly to the addressee user email box without being processed through the queue system 118, while certain specified email box accounts (e.g., support@corp.com) are directed to the centralized inbox 112 for processing through the queue system 118.

In one embodiment, the email system 106 may include a database system 114. In one embodiment, the database system 114 includes non-transitory memory and is configured to store all incoming emails. In another embodiment, the database system 114 can be considered a back-up storage for all emails. In yet another embodiment, the database system 114 is operatively configured such that emails are not deletable by a user of the email system 106. As used herein, an "email system user" is defined as a user having an email account associated with the email system 106 and a corresponding user email box. In one embodiment, the email system 106 can be configured such that only users having an email administrator or other specialized account may delete emails. In another embodiment, the database system 114 is operatively configured such that email attachments are not deletable by a user of the email system 106.

In FIG. 1, the database system 114 is shown as a separate component from the centralized inbox 112. In other embodiments, the database system 114 is included in the centralized inbox 112. In yet other embodiments, the centralized inbox 112 can be considered the database system 114 in that all incoming emails received into the centralized inbox 112 are stored in at least a portion of non-transitory memory defining the centralized inbox 112, such that a separate database is not required. In one embodiment, the database system 114 includes one database. In other embodiments, the database system 114 includes more than one database.

Figure 5:
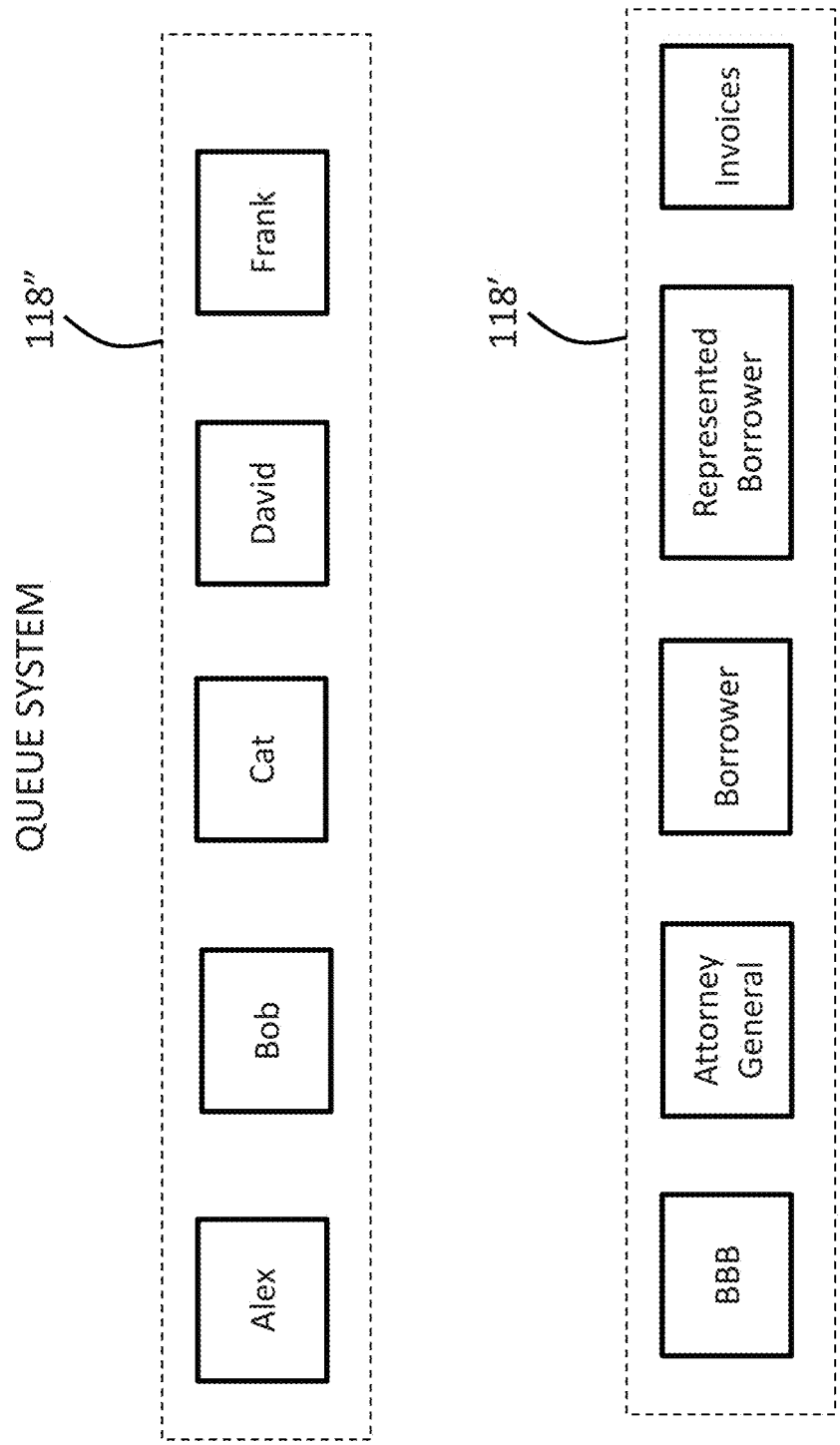
FIG. 5 is a block diagram of two exemplary methods of dividing queues in accordance with an embodiment of the present invention.

In one embodiment, the email system 106 further includes an email process flow module 116. In another embodiment, the email process flow module 116 can be considered a software application or a set of computer instructions configured to determine where to assign emails from the centralized inbox 112. In a further embodiment, the email process flow module 116 includes instructions to assign all incoming emails to an initial intake queue, e.g., Queue 1, where one or more email system users associated with the initial intake queue reviews the emails and assigns the emails to an appropriate queue based on a company process. For example, as illustrated in FIG. 5, a queue system 118' may be divided according to general subject matter, where the initial intake queue users are tasked with reviewing the emails to determine general subject matter and assign each email to the corresponding subject matter queue. In another embodiment, as can be seen in FIG. 5, the queue system 118" may be divided according to email system user and the initial intake queue user reviews the emails to determine which user the email should be assigned to and subsequently assigns the email to the appropriate email system user's queue. In yet a further embodiment, the email process flow module 116 is configured with instructions to automatically evenly distribute all incoming emails to all queues or to a subset of queues. For example, the email process flow module 116 may distribute all incoming emails to queue 1, queue 2, and queue 3 so as to evenly distribute the emails to each of said queues. In yet another embodiment, the email process flow module 116 is configured to distribute all emails to a subset of queues, unless one of the subset of queues reaches a predetermined threshold of unanswered emails, which results in distribution of emails to a second, alternative subset of queues that can be considered overflow queues that do not receive incoming emails unless there is a backlog of unanswered emails. As is apparent, there can be many ways to configure the email process flow module 116 to control, direct, and/or manage the flow of incoming emails. In a preferred embodiment, the email process flow module 116 is configured so as to allow email administrators or other special user accounts to create a set of customizable rules according to a desired company process for handling emails and assigning emails to various queues. As used herein, the term "customizable rules" is intended to indicate a set of user-selected or user-created rules to control how the email system 100 processes, handles, and/or assigns emails. In one embodiment, the customizable rules can include rules specifying that a key word within the body of the email determines the flow of the email (e.g., which queue(s) the email will be assigned to). In another embodiment, the customizable rules can include rules specifying that the source of the email or the email sender determines the flow of the email. For example, all emails from a particular domain can be automatically assigned to a designated queue for receiving incoming emails from said domain.

Figure 2:
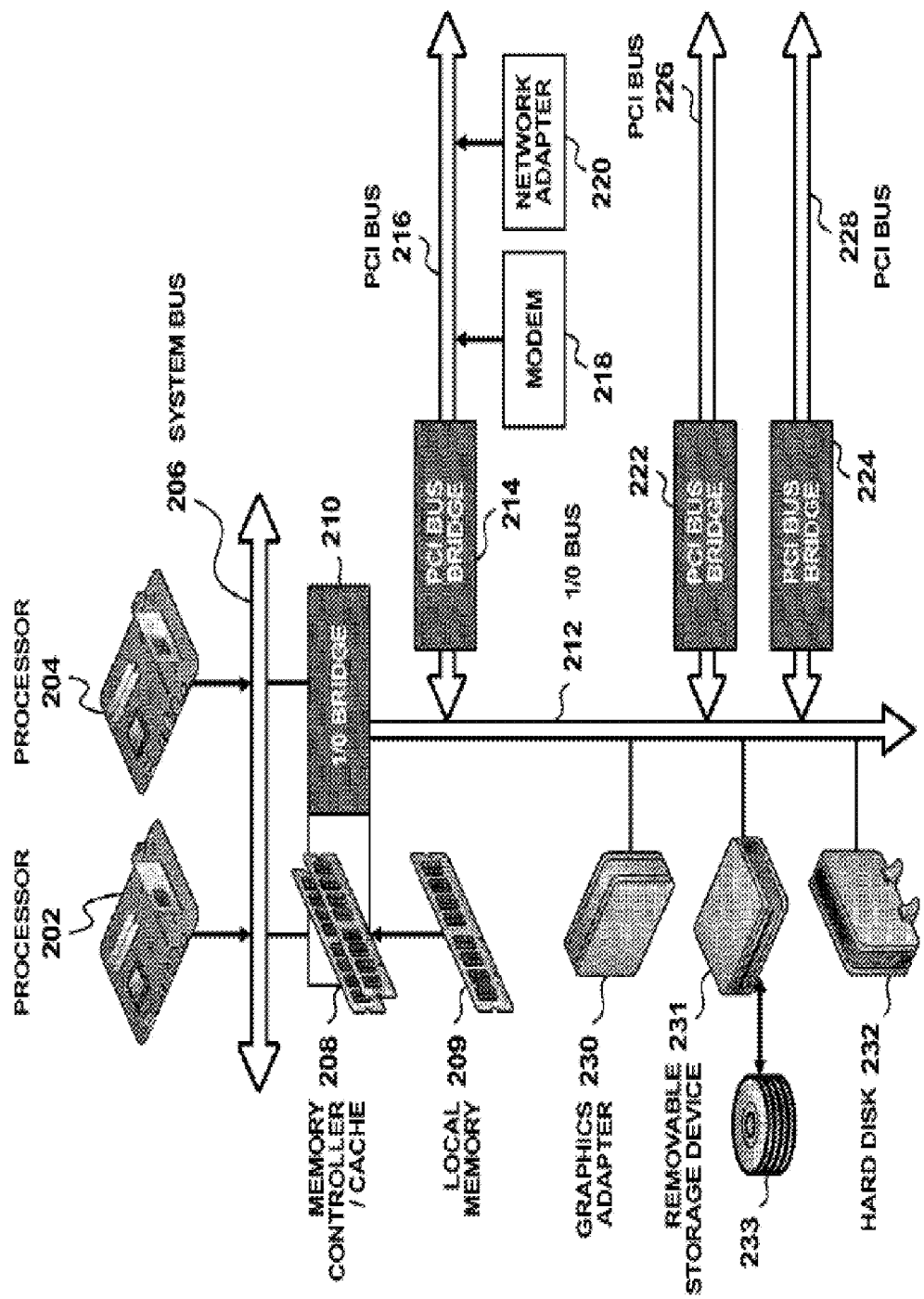
FIG. 2 is a block diagram of a data processing system that may be implemented as a network device, such as the sender computer or a server computer within the email system as shown in FIG. 1, in accordance with an embodiment of the present invention.

Referring to FIG. 2, a block diagram of a data processing system 200 that may be implemented as a sender computer 104 or implemented as a server, such as the incoming email server 110, as shown in FIG. 1, in accordance with one embodiment of the present invention is shown. The data processing system 200 may be a symmetric multiprocessor (SMP) system including a plurality of processors 202 and 204 connected to system bus 206. Alternatively, a single processor system may be employed. Also, connected to system bus 206 is memory controller/cache 208, which provides an interface to local memory 209. An I/O bus bridge 210 is connected to system bus 206 and provides an interface to I/O bus 212. The memory controller/cache 208 and I/O bus bridge 210 may be integrated as depicted. The processor 202 or 204 in conjunction with memory controller 208 controls what data is stored in memory 209. The processor 202 and/or 204 and memory controller 208 can serve as a data counter for counting the rate of data flow to the memory 209 or from the memory 209 and can also count the total volume of data accessed to or from the memory 209. The processor 202 or 204 can also work in conjunction with any other memory device or storage location.

Peripheral component interconnect (PCI) bus bridge 214 connected to I/O bus 212 provides an interface to PCI local bus 216. A number of modems 218, or wireless cards, may be connected to PCI bus 216. Typical PCI bus implementations will support four PCI expansion slots or add-in connectors. PCI includes, but is not necessarily limited to, PCI-X and PCI Express components. Communications links to the network of computers in FIG. 1 may be provided through the modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, the data processing system 200 allows connections to a multiple network of computers. A graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The method of the present invention is explained in detail below and can be embodied in a computer program. Computer programs (also called computer control logic) are stored in memory such as main memory 209, removable storage drive 231, removable media 233, hard disk 232, and signals. Such computer programs, when executed, enable the computer system to perform the features of the present invention as discussed herein. In particular, the computer programs, when executed, enable the processor 202 and/or 204 to perform the features of the presently inventive method.

In this document, the terms "computer program medium," "computer usable medium," and "computer readable medium" are used to generally refer to media such as main memory 209, removable storage drive 231, removable media 233, hard disk 232, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired or wireless network that allows a computer to read such computer readable information.

Figure 3A:
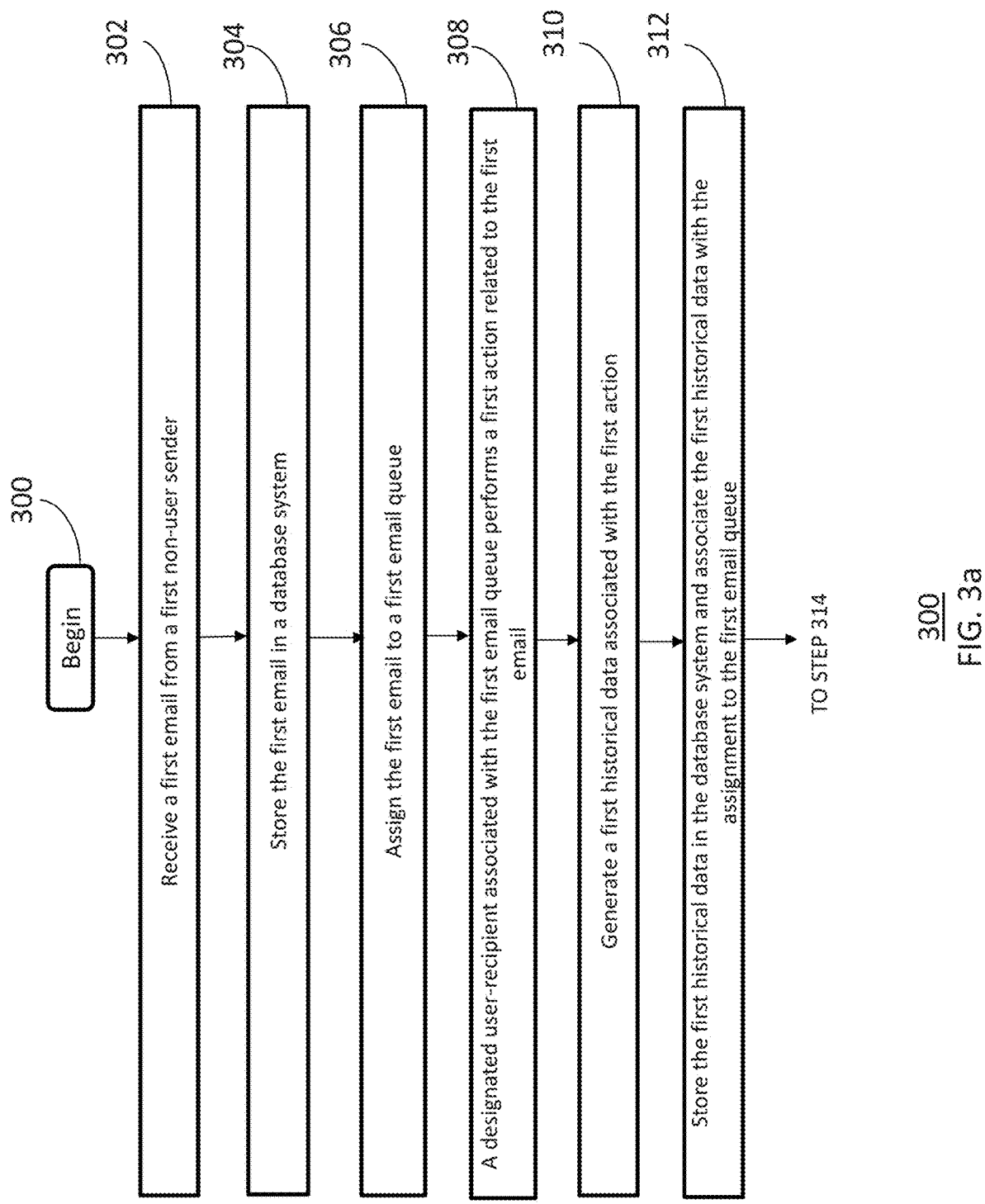
FIG. 3a is a process flow chart representing an exemplary method for processing an email within a network in accordance with an embodiment of the present invention.
Figure 3B:
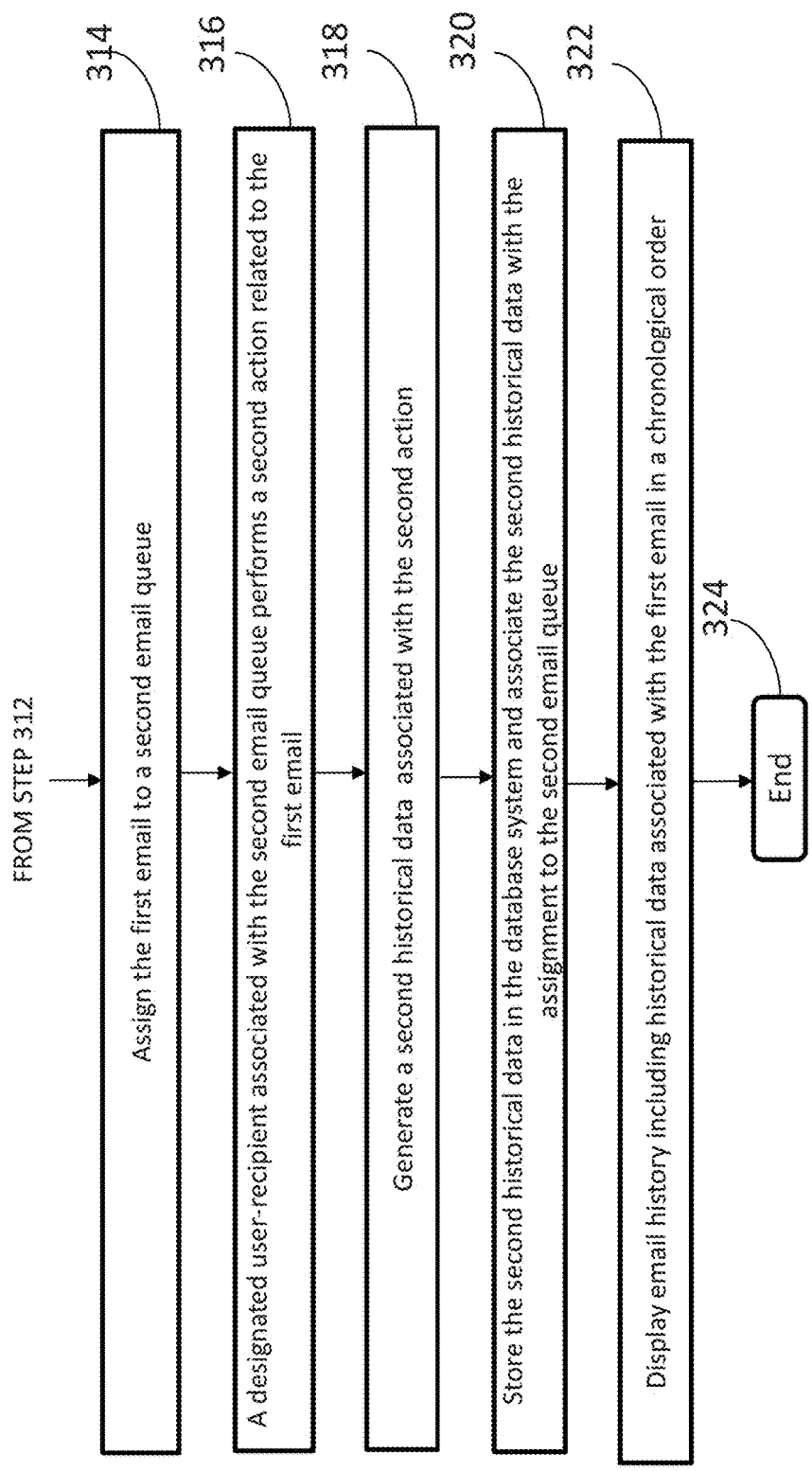
FIG. 3b is continuation flow chart of the exemplary process shown in FIG. 3a, in accordance with the present invention.

Referring to FIGS. 3a-3b, an exemplary process is described with reference to FIGS. 1 and 4-9. Although FIGS. 3a-3b show a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIGS. 3a-3b for the sake of brevity.

The process of FIG. 3 begins at step 300 and moves directly to step 302, where the email system 106 receives a first email from a non-user sender. As used herein, the term "non-user sender" is defined as a sender computer 104 that is not associated with the email system 106. In other words, a non-user sender is an email terminal that sends emails to a domain associated with the email system 106, but is not an email terminal with an email box within the email system 106 or having an email account associated with said domain.

In one embodiment, the first email is received into the incoming email server 110. In a further embodiment, the first email is received into the incoming email server 110 and subsequently sent to the centralized inbox 112. In yet a further embodiment, the first email is stored in non-transitory memory associated with the centralized inbox 112. In another embodiment, emails that are assigned to queues are deleted from the centralized inbox 112 to clear memory for subsequent incoming emails.

In step 304, the email system 106 stores the first email in the database system 114 communicatively coupled to the email system 106. In one embodiment, the email system 106 stores the first email within non-transitory member of the database system 114. In another embodiment, the first email is stored in the database system 114 such that the first email is not deleteable by an email system user. In a further embodiment, the first email is stored in the database system 114 such that the first email is only deletable by an email administrator of the email system 106. This provides a level of security and accountability over company employees who may, for personal reasons, desire to delete certain unfavorable emails. In one embodiment, the database system 114 is a component of the incoming email server 110.

In step 306, the email system 106 assigns the first email to a first one of a plurality of email queues. In one embodiment, a queue can be considered a segment of computer memory dedicated to storing items in the queue, such as emails and associated data. In another embodiment, the queue includes a first-in-first-out (FIFO) organized sequence of items or emails. In other words, the queue can be organized such that the first email into the queue is the first email that exits the queue for assignment of said email to a user email box associated with the queue. In a further embodiment, assignment of the first email to an email queue is performed according to a predetermined email process flow. As described above in reference to the email process flow module 116 depicted in FIG. 1, assignment of emails to queues can be performed according to instructions and/or rules created for a particular company. For example, a customer service center may select an email process flow different from an email process flow desired by a law firm.

In one embodiment, the email process flow includes a set of customizable rules created by an email system administrator and executed by the email system 106. As used herein, an "email system administrator" is an email system user whose system account includes permissions to alter or change company-wide email configurations within the email system 106, which permissions are different from permissions granted to accounts of typical email system users. In a further embodiment, each of the plurality of email queues is associated with at least one designed user-recipient. As used herein, the term "designated user-recipient" is intended to indicate an email system user associated with an email queue and thereby designated to receive at least a portion of emails within said email queue. In yet a further embodiment, the designated user-recipient has a skill set suitable for processing emails within the associated email queue. Stated another way, each designated user-recipient assigned to an email queue possesses a skill set suitable for processing or handling emails intended for said email queue. For example, an email system implemented for a customer service center may include one queue for billing issues and another queue for information technology (I.T.) issues. Accordingly, designated user-recipients for the billing issues' queue are qualified to handle billing issues and operate on computers with access to the company's billing system, whereas designated user-recipients for the I.T. issues' queue are I.T. technicians that are capable of handling I.T.-related computer/website issues. In one embodiment, the designated user-recipient is selectively associated with the email queue by an email system administrator.

Figure 4:
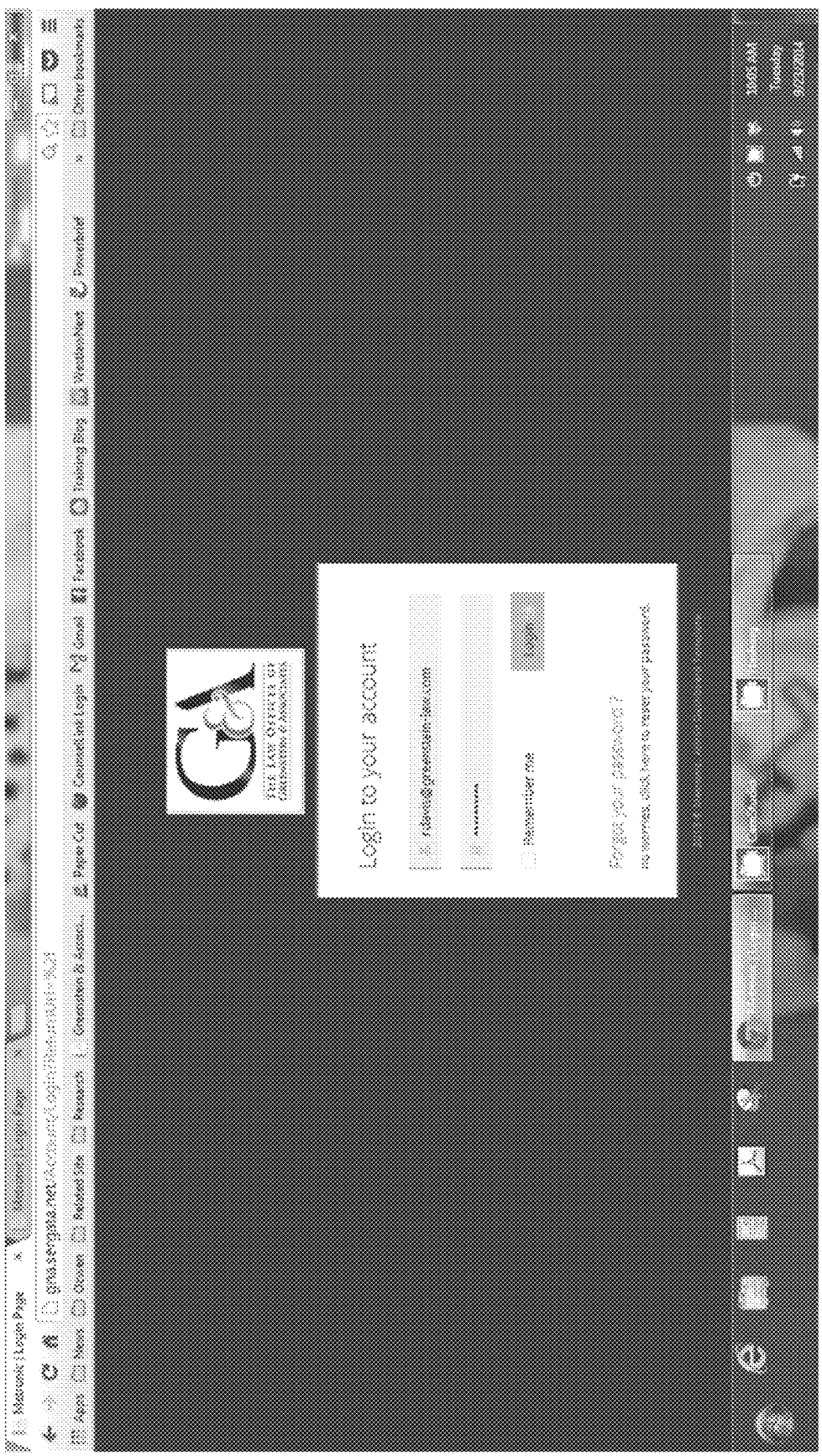
FIG. 4 is a screenshot of an exemplary software application at least partially implementing the inventive process, the screenshot depicting a login screen on a user's computer terminal in accordance with an embodiment of the present invention.

In one embodiment, before the designated user-recipient can access emails within his or her queue, the designated user-recipient may be required to login to his or her email account. FIG. 4 depicts an exemplary login user interface 400. Subsequent to creating a login, a user may input his or her username or email account and password in order to be given access to his/her email account user interface.

In step 308, the designated user-recipient associated with the first one of the plurality of email queues performs a first action related to the first email. As used herein, the term "action" is defined as an act or acts performed by a designated user-recipient that moves an email forward within a company process toward a resolution of a matter or an issue associated with the email. For example, one exemplary action may be to assign the first email to another queue. Another exemplary action may include downloading an attachment, reviewing the attachment, and saving the attachment to an appropriate file. Yet another exemplary action may include drafting a reply to the first email and sending the reply. Another exemplary action may include responding to the email by resolving a request within the email to docket for a deadline and sending a confirmation response email. As is apparent, many actions can be performed to transition a matter associated with an email toward a resolution. In one embodiment, the email system 106 can include a user interface with a progress status bar 702 visually indicating where, within a company process, the processed email is currently at (see FIG. 7). Advantageously, designated user-recipients and other email system users may be able to view whether the matter or issue is resolved, and/or approximately how much more processing the matter associated with the email requires before a resolution is achieved.

In step 310, the email system 106 generates a first historical data associated with the first action. Advantageously, historical data can allow email system users to quickly determine how, who, what, where, and/or when actions were performed on the first email. For example, email system users may be able to view historical data so as to be able to quickly determine which email system users have been assigned the first email and when the assignments took place. Assigning an email to an email system user is an improvement over prior art systems where users can only forward emails to one another. Forwarding an email results in the email being sent to the recipient user's inbox, but this does not allow the user who originally forwarded the email to be able to quickly determine if and when the recipient acted on the email in a convenient, transparent manner, as with the present invention.

FIG. 6 depicts a screenshot of an exemplary user interface 600 that displays historical data associated with an email. As used herein, the term "historical data" is defined as data providing information about an action performed on an email, the information being associated with a date, a time, or other time-related data. Preferably, the historical data describes a sequence of actions performed on the email, rather than a single action performed at a single time or date. In one embodiment, the historical data includes a time interval defined by an amount of time that a designated user-recipient performed an action on the first email (e.g., the amount of time it took a designated user-recipient to prepare a response email). In another embodiment, the historical data includes a date and/or time when the first email was assigned to a designated user-recipient. In another embodiment, the historical data includes a data and/or time when the first email was received into or assigned to a queue. In yet another embodiment, the historical data includes a description of an action performed by a designated user-recipient on the first email (e.g., re-assignment of the first email to another user-recipient). In yet another embodiment, the historical data may include an amount of time it took for the first email to be processed through to resolution. In yet a further embodiment, the historical data may include an amount of time it took for a designated user-recipient to perform an action on the email from when the designated user-recipient was initially assigned the first email. In one embodiment, a user-interface associated with an email system user may include a timer for measuring elapsed time. The timer may include a start button and a stop button, similar to a stopwatch feature. In a further embodiment, the timer may be used for billing purposes. For example, law firms bill clients based on an hourly rate; therefore, measuring the time interval for performing an action on an email can be useful for billing purposes when billing for time dedicated to an email. In one embodiment, the timer can be used to determine a time interval defined by an amount of time that a designated user-recipient actively processed the first email. As used herein, the term "actively process" is defined as actively handling an email by performing an action associated with the email (as opposed to a passive action, such as allowing the email to sit in an inbox or queue without being acted on).

In one embodiment, the time interval is associated with the designated user who performed the action and the time interval is also associated with the acted upon email. The association can occur, for example, through computer programming, whereby, for example, a programming object associated with the first email may include a data field storing the time interval and a data field storing an identification of the designated user-recipient. The association of the first email to collected data, such as time intervals and designated user-recipients assigned thereto, can be accomplished in any number of methods known in the art for associating one set of data with another using a computer. In a further embodiment, the time interval is used to generate a bill or invoice for processing the first email. In yet a further embodiment, the bill includes an identification of the time interval and an identification code (e.g., docket number, account number, customer service request number, etc.) identifying a matter or issue associated with the first email. The identification code can be an alphanumeric code.

In step 312, the email system 106 stores the first historical data in the database system 114 or other non-transitory memory communicatively coupled to the email system 106. In one embodiment, the email system 106 associates the first historical data with the assignment of the first email to the first one of the plurality of email queues. Advantageously, the first email becomes associated with a multitude of descriptive information that is able to allow email system users to quickly and easily determine when and what actions were performed on the first email throughout its processing life through the email system 106. In one embodiment, the first historical data includes an identification of a designated user-recipient associated with the assignment to the first one of the plurality of email queues. For example, FIG. 6 depicts a screenshot showing historical data that includes an identification of an email system user, Asiel, describing that Asiel performed an action of assigning new documents at 20:55 and performed an action of re-assigning the email at 20:56 on Mar. 14, 2014. By associating times and actions with a designated user-recipient, a supervising entity or other email system users can identify which employee(s) have participated in processing the first email through the email system 106. This information can be useful for many purposes, including, but not limited to, verifying billing entries, verifying work performance, following up on matters, knowing which employee to contact in order to inquire into further details regarding the matter, etc.

In step 314, after assigning the first email to the first one of the plurality of email queues, the email system 106 assigns the first email to a second email queue, different from the first email queue. In one embodiment, assignment of the first email to the second queue is performed automatically according to the predetermined email process flow. In another embodiment, assignment of the first email to the second email queue is performed by the designated user-recipient associated with the first queue. In an exemplary embodiment, assignment of the first email from one queue to another queue is performed by the designated user-recipient associated with the previously assigned queue, rather than the predetermined email process flow. In a further embodiment, each email terminal within the email system 106 that has a user email box may be restricted to a predetermined email process flow. For example, in one embodiment, the user email box 1 may be configured so as to be able to assign emails only to user email box 2. As another example, in another embodiment, the email terminal associated with user email box 3 may be configured so as to be able to receive assignments only from user email box 5. Advantageously, this allows companies to be able to control the assignment of emails through the email system 106 on a terminal-by-terminal basis, as well as, or instead of an overall predetermined email process flow.

In step 316, the designated user-recipient associated with the second email queue performs a second action related to the first email. In one embodiment, the second action is different from the first action. For example, one exemplary action may be to assign the first email to another queue. Another exemplary action may include downloading an attachment, reviewing the attachment, and saving the attachment to an appropriate file. Yet another exemplary action may include drafting a reply to the first email and sending the reply. Another exemplary action may include responding to the email by resolving a request within the email to docket for a deadline and sending a confirmation response email. As is apparent, many actions can be performed to transition a matter associated with an email toward a resolution.

In one embodiment, subsequent emails can be associated with prior incoming emails such that emails associated with the same subject or matter are coupled together. For example, a first incoming email may be replied to by a first email account user within the email system 100. Subsequently, a second incoming email may be received by a second email account user within the email system 100 regarding the same matter. The first and second email account users may associate the first and second incoming emails, respectively, with said matter by, for example, associating the emails with a unique alphanumeric identifier associated with said matter. Accordingly, a third email account user within the email system 100 may access the matter and be able to view all emails associated with that matter, without the need to be forwarded all the emails from the various email account users in order to view the subject matter history, as is the case with many existing email systems. In one embodiment, associating emails with a subject matter includes associating emails with a unique subject matter identifier (e.g. docket number or matter reference number) by, for example, a user entering the unique subject matter identifier into a user interface input field on a computer terminal to associate a received email with the unique subject matter identifier. In another embodiment, accessing all emails associated with the unique subject matter identifier may include the user clicking on an icon or button associated with the unique subject matter identifier and being presented all of the emails in a single screen/computer user interface.

In step 318, the email system 106 generates a second historical data associated with the second action. In one embodiment, the second historical data is different from the first historical data. Advantageously, historical data can allow email system users to quickly determine how, who, what, where, and when actions were performed on the first email. For example, email system users may be able to view historical data so as to be able to quickly determine which email system users have been assigned the first email and when the assignments took place. FIG. 6 depicts the exemplary user interface 600 that displays historical data associated with the first email. Preferably, the historical data describes a sequence of actions performed on the first email, rather than a single action performed at a single time or date. In one embodiment, the historical data includes a time interval defined by an amount of time that a designated user-recipient performed an action on the first email (e.g., the amount of time it took a designated user-recipient to prepare a response email). In another embodiment, the historical data includes a date and/or time when the first email was assigned to a designated user-recipient. In another embodiment, the historical data includes a date and/or time when the first email was received into or assigned to a queue. In yet another embodiment, the historical data includes a description of an action performed by a designated user-recipient on the first email (e.g., re-assignment of the first email to another user-recipient). In yet another embodiment, the historical data may include an amount of time it took for the first email to be processed through to resolution. In yet a further embodiment, the historical data may include an amount of time it took for a designated user-recipient to perform an action on the email from when the designated user-recipient was initially assigned the first email.

In step 320, the email system 106 stores the second historical data in the database system 114 or other non-transitory memory communicatively coupled to the email system 106. In one embodiment, the email system 106 associates the second historical data with the assignment of the first email to the second email queue. Advantageously, the first email becomes associated with a multitude of descriptive information that is able to allow email system users to quickly and easily determine when and what actions were performed on the first email throughout its processing life through the email system 106. In one embodiment, the second historical data includes an identification of a designated user-recipient associated with the assignment to the second email queue. For example, FIG. 6 depicts the screenshot showing historical data that includes an identification of an email system user, Samantha, describing that Samantha performed an action of assigning new documents at 16:05 and performed an action of re-assigning the email at 16:05 on Mar. 24, 2014. By associating times and actions with a designated user-recipient, a supervising entity or other email system users can identify which employee(s) have participated in processing the first email through the email system 106. This information can be useful for many purposes, including, but not limited to, verifying billing entries, verifying work performance, following up on matters, knowing which employee to contact in order to inquire into further details regarding the matter, etc.

In step 322, in response to an email system user request, the email system 106 displays, on a display communicatively coupled to an email terminal of said user, the email history describing sequential assignments to the plurality of email queues. In one embodiment, the email history includes the first and second historical data in a chronological order. In one embodiment, the chronological order is a descending chronological order. In an alternative embodiment, the chronological order is an ascending chronological order. In another embodiment, the email history is displayed on a single screen. FIG. 6 depicts an exemplary embodiment of the email history for a single email as it was processed through the email system 106. Advantageously, sequential assignments throughout the plurality of email queues are tracked and stored in non-transitory memory and associated with the email being sequentially assigned such that at any point in time its email history can be accessed to determine where the email is currently at within the email system 106.

As is common, employees may be absent from work for a period time. In such cases, it may be desirable to re-assign emails to an alternate designated user-recipient so that emails can continue to be processed even where an employee is absent. In one embodiment, the email system 106 may allow an email administrator, supervising entity, or other email system user to selectively re-assign the first email to an alternate designed user-recipient in response to an absence of an assigned designated user-recipient. This feature can be particularly useful where an employee absence is considered rather lengthy as compared to the standard processing time for an email. In an alternative embodiment, the email system 106 may automatically re-assign the first email to the alternate designated user-recipient when the email system 106 determines that the designated user-recipient is absent. In one embodiment, the email system 106 may be configured to make such determination when the email system 106 determines that the email terminal associated with an employee has been inactive for a predetermined period of time, such as 5 hours, on a business day, as measured from the beginning of the work day, e.g., 8 a.m. In another embodiment, email system users can escalate emails involving exposure by assigning the email to a manager queue. In yet another embodiment, the email system 106 can automatically escalate emails that have been idle, i.e., not acted on, for a predetermined period of time by automatically assigning the email to a senior manager queue if the email has not been acted on within, for example, 5 days. The process ends at step 324.

Figure 7:
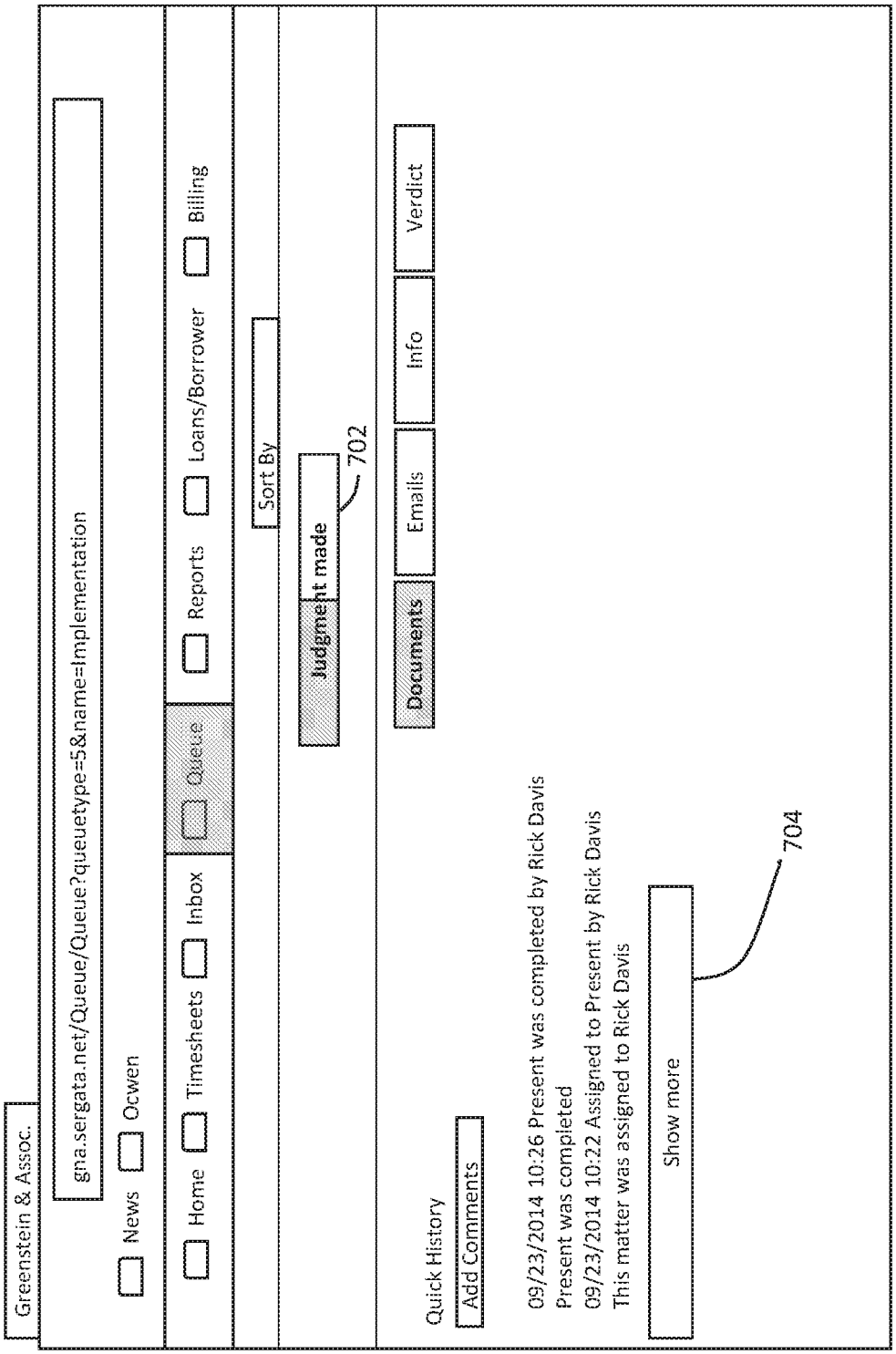
FIG. 7 is a screenshot of the exemplary software application of FIG. 4 depicting a user interface displaying another exemplary log of a single email's history in accordance with an embodiment of the present invention.

Referring to FIG. 7, a screenshot 700 of an exemplary user interface displayed on an email system user's email terminal is illustrated. The screenshot 700 illustrates an example of the email history 704. The screenshot 700 also illustrates the progress status bar 702, which visually indicates where, within a company process, the processed email is currently at. The progress status bar 702 can be implemented in any number of sizes, shapes, and configurations used to visually indicate progress, such as, for example, a circular pie chart, rather than a rectangular bar.

Figure 8:
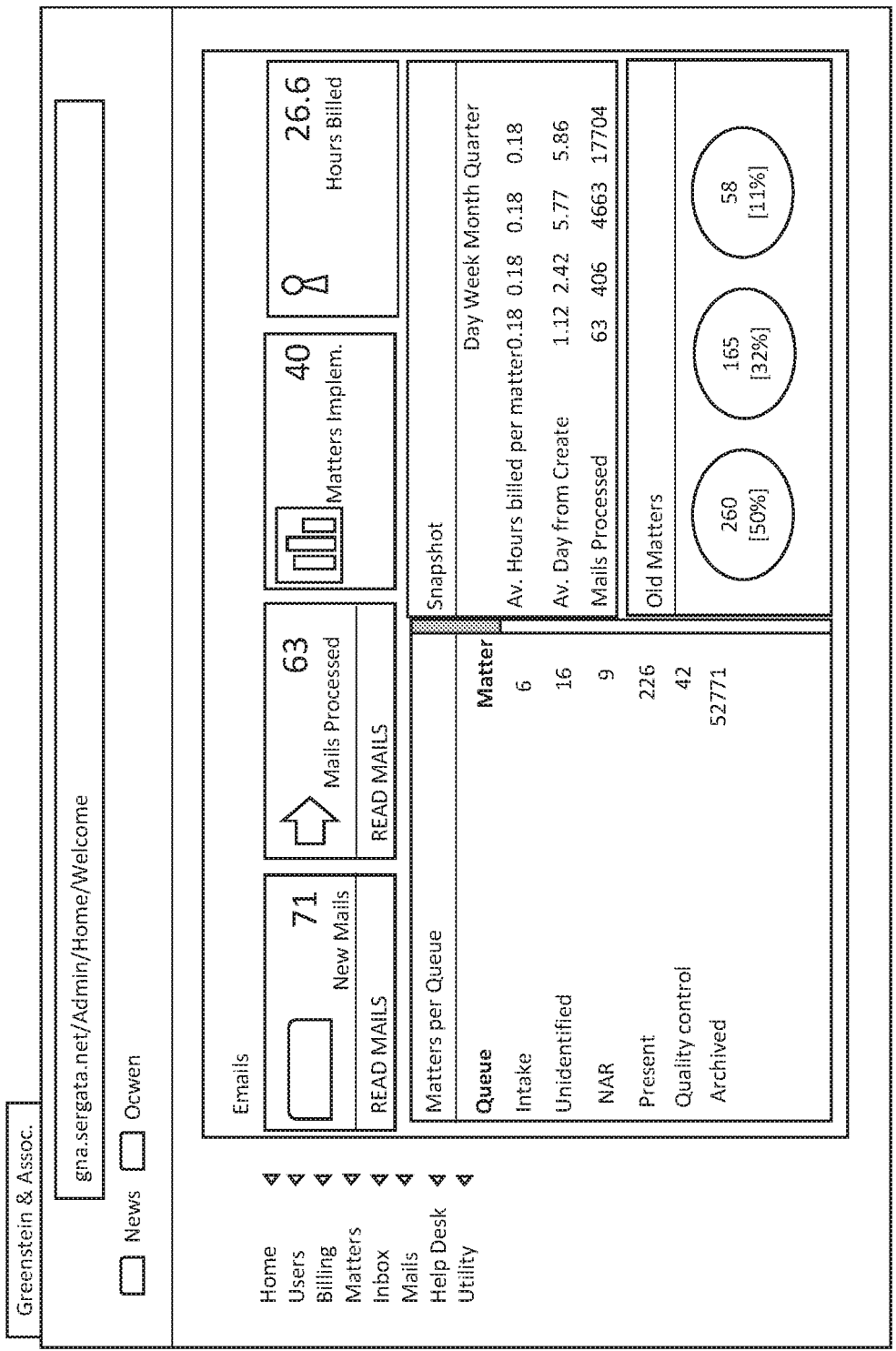
FIG. 8 is a screenshot of the exemplary software application of FIG. 4 depicting a user interface displaying an email administrator's interface in accordance with an embodiment of the present invention.

Referring to FIG. 8, a screenshot 800 of an exemplary user interface is depicted. The screenshot 800 can be considered a home screen for a logged-in email system user that displays a multitude of email-related information to the user via a display communicatively coupled to the user's email terminal. In one embodiment, the user interface is displayed via a browser. In another embodiment, the user interface is displayed via another type of software application. The screenshot 800 shows a list of matters in each of a plurality of queues. The screenshot 800 also provides analytical data, such as the average hours billed per matter during a time period, emails processed during a time period, matters implemented during a time period, etc.

Figure 9:
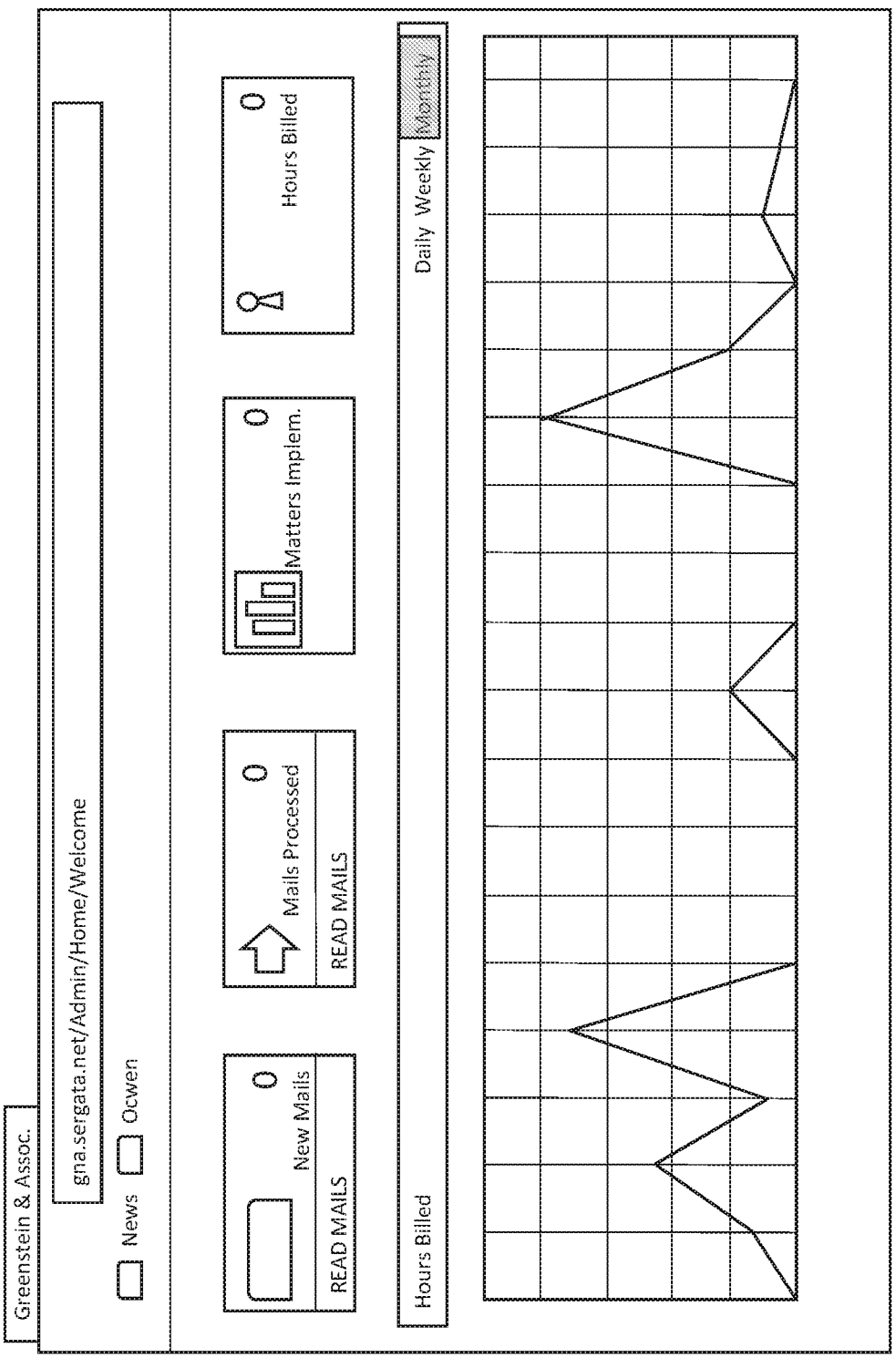
FIG. 9 is a screenshot of the exemplary software application of FIG. 4 depicting a user interface displaying a graphical report illustrating an amount of hours billed responding to emails over a period of time in accordance with an embodiment of the present invention.

Referring to FIG. 9, a screenshot 900 of a graphical chart displaying analytical data is shown. In particular, the screenshot 900 shows a graphical chart of the amount of hours bills through the email system 106 over a thirty day time period. In other embodiments, the graphical chart can show other email analytics, such as an amount of emails processed over a specified time period, an amount of matters implemented over a specified time period, an amount of time a particular email system user has spent reviewing emails over a specified time, etc. Advantageously, the email system 106 can allow email administrators to specify and select particular data items to track, analyze, and generate reports about.

A novel and inventive system and method for processing incoming emails into an email system with a multitude of email user accounts has been disclosed that allows the incoming emails to be processed efficiently through a company process via a queue system. The queue system includes a plurality of email queues that can be organized according to user or subject matter of the email. Incoming emails are assigned to an initial intake queue and then re-assigned to another queue depending on the email content. A single email can be assigned to more than one queue at different time periods as it is being processed through the email system by various email account users. The email system is able to track the email as it travels through the queue system and is acted on by various email system users at various times through the life of the email. This historical data can be easily accessed by email system users so that a chronological history of the email can be provided with ease. The email system provides email transparency in that the chronological history of the email is easily accessible and analytics regarding email use and other email-related data can be analyzed and reported on in order to improve the efficiency of email processing and employee production.

What is claimed is:

1. A computer-implemented method for processing email, the method comprising:

receiving a first email via an email system;

storing the first email in a database system communicatively coupled to the email system;

assigning the first email to a first one of a plurality of email queues in a first assignment, each of the plurality of email queues associated with at least one designated user-recipient, the at least one designated user-recipient having a skill set suitable for processing emails within the associated email queue;

a designated user-recipient associated with the first one of the plurality of email queues accessing the first email from the first one of the plurality of email queues and performing a first action related to the first email, wherein the first action is at least one of drafting and sending a reply to the first email, or resolving a request within the first email by docketing a deadline and sending a confirmation response email;

the email system, in response to the designated user-recipient associated with the first one of the plurality of email queues accessing the first email from the first one of the plurality of email queues and performing the first action related to the first email, automatically generating and storing a first historical data and associating the first historical data with the first assignment of the first email to the first one of the plurality of email queues, the first historical data including an identification of the designated user-recipient associated with the first one of the plurality of email queues and an indication of an amount of time spent by the designated user-recipient associated with the first one of the plurality of email queues in performing the first action and a description of the first action;

after assigning the first email to the first one of the plurality of email queues and in response to the designated user-recipient associated with the first one of the plurality of email queues accessing the first email from the first one of the plurality of email queues and performing the first action related to the first email, assigning the first email to a second one of the plurality of email queues in a second assignment;

a designated user-recipient associated with the second one of the plurality of email queues accessing the first email from the second one of the plurality of email queues and performing a second action related to the first email that is different from the first action;

the email system, in response to the designated user-recipient associated with the second one of the plurality of email queues accessing the first email from the second one of the plurality of email queues and performing the second action related to the first email, automatically generating and storing a second historical data and associating the second historical data with the assignment of the first email to the second one of the plurality of email queues, the second historical data including an identification of a designated user-recipient associated with the second assignment to the second one of the plurality of email queues and an indication of an amount of time spent by the designated user-recipient associated with the second one of the plurality of email queues in performing the second action and a description of the second action;

the email system displaying an email history of the first email, the email history describing sequential assignments to the plurality of email queues and including the first and second historical data in a chronological order;

determining a first time interval, defined as the amount of time that the designated user-recipient associated with the first one of the plurality of email queues spent performing the first action based on the first historical data;

determining a second time interval, defined as the amount of time that the designated user-recipient associated with the second one of the plurality of email queues spent performing the second action on the first email based on the second historical data; and generating a bill for processing the first email, the bill including the first time interval, description of the first action, the second time interval, the description of the second action, and an identification code identifying a matter associated with the first email.

2. The method in accordance with claim 1, wherein:
assignment of the first email to the first and the second ones of the plurality of email queues is performed according to a predetermined email process flow.

3. The method in accordance with claim 2, wherein:
the predetermined email process flow includes a set of customizable rules created by an email system administrator.

4. The method in accordance with claim 1, wherein:
receiving the first email includes receiving the first email into a centralized inbox communicatively coupled to the email system.

5. The method in accordance with claim 1, wherein:
assigning the first email to the second one of the plurality of email queues is performed by the designated user-recipient associated with the first one of the plurality of email queues.

6. The method in accordance with claim 1, further comprising:
displaying a progress bar for the first email with the first email when the first email is accessed by the designated user-recipient associated with the first one of the plurality of email queues indicating a first progress amount; and
displaying a progress bar for the first email with the first email when the first email is accessed by the designated user-recipient associated with the second one of the plurality of email queues indicating a second progress amount that is more than the first progress amount.

7. The method in accordance with claim 1, wherein:
the database system is operatively configured such that the first email is not deleteable by an email system user.

8. The method in accordance with claim 1, further comprising:
selectively re-assigning the first email to an alternate designated user-recipient in response to an absence of an assigned designated user-recipient.

9. The method in accordance with claim 1, further comprising:
associating the first email with a unique subject matter identifier;
receiving a second email and associating the second email with the unique subject matter identifier, both the first and second email accessible by an email system user who is not a user-recipient of either of the first or the second email via the unique subject matter identifier and without being forwarded the first and the second emails.

10. A non-transitory computer-readable medium with instructions stored thereon, that when executed by a processor, performs the steps comprising:
receiving a first email via an email system;
storing the first email in a database system communicatively coupled to the email system;

assigning the first email to a first one of a plurality of email queues in a first assignment, each of the plurality of email queues associated with at least one designated user-recipient, the at least one designated user-recipient having a skill set suitable for processing emails within the associated email queue;

a designated user-recipient associated with the first one of the plurality of email queues accessing the first email from the first one of the plurality of email queues and performing a first action related to the first email, wherein the first action is at least one of drafting and sending a reply to the first email, or resolving a request within the first email by docketing a deadline and sending a confirmation response email;

in response to the designated user-recipient associated with the first one of the plurality of email queues accessing the first email from the first one of the plurality of email queues and performing the first action related to the first email, generating and storing a first historical data and associating the first historical data with the first assignment of the first email to the first one of the plurality of email queues, the first historical data including an identification of the designated user-recipient associated with the first one of the plurality of email queues and an indication of an amount of time spent by the designated user-recipient associated with the first one of the plurality of email queues to perform the first action;

after assigning the first email to the first one of the plurality of email queues and in response to the designated user-recipient associated with the first one of the plurality of email queues accessing the first email from the first one of the plurality of email queues and performing the first action related to the first email, assigning the first email to a second one of the plurality of email queues in a second assignment;

a designated user-recipient associated with the second one of the plurality of email queues accessing the first email from the second one of the plurality of email queues and performing a second action related to the first email that is different from the first action;

in response to the designated user-recipient associated with the second one of the plurality of email queues accessing the first email from the second one of the plurality of email queues and performing the second action related to the first email, generating and storing a second historical data and associating the second historical data with the second assignment of the first email to the second one of the plurality of email queues, the second historical data including an identification of the designated user-recipient associated with the second one of the plurality of email queues and an indication of an amount of time spent by the designated user-recipient associated with the second one of the plurality of email queues to perform the second action;

in response to a user request, displaying an email history of the first email, the email history describing sequential assignments to the plurality of email queues and including the first and second historical data in a chronological order;

determining a first time interval, defined as the amount of time that the designated user-recipient associated with the first one of the plurality of email queues spent performing the first action based on the first historical data;

determining a second time interval, defined as the amount of time that the designated user-recipient associated with the second one of the plurality of email queues spent performing the second action on the first email based on the second historical data; and generating a bill for processing the first email, the bill including the first time interval, description of the first action, the second time interval, the description of the second action, and an identification code identifying a matter associated with the first email.

11. The non-transitory computer readable medium in accordance with claim 10, wherein:
assigning the first email to the first and the second ones of the plurality of email queues is performed according to a predetermined email process flow.

12. The non-transitory computer readable medium in accordance with claim 11, wherein:
the predetermined email process flow includes a set of customizable rules created by an email system administrator.

13. The non-transitory computer readable medium in accordance with claim 10, wherein:
assigning the first email to the second one of the plurality of email queues is performed by the designated user-recipient associated with the first one of the plurality of email queues.

14. The non-transitory computer readable medium in accordance with claim 10, wherein the steps further comprise:
determining a time interval defined by an amount of time that a designated user-recipient actively processes the first email in the associated email queue and associating the time interval with said designated user-recipient and the first email; and
using said time interval to generate a bill for processing the first email, the bill including the time interval and an identification code identifying a matter associated with the first email.

15. The non-transitory computer readable medium in accordance with claim 10, wherein:
the database system is operatively configured such that the first email is not deleteable by an email system user.

16. The non-transitory computer readable medium in accordance with claim 10, wherein the steps further comprise:
selectively re-assigning the first email to an alternate designated user-recipient in response to an absence of an assigned designated user-recipient.

17. A system for processing email, the system comprising:
a centralized inbox communicatively coupled to an email system, the centralized inbox operably configured to receive a first email;
a database system communicatively coupled the email system, the database system operably configured to store the first email;
a processor communicatively coupled to the email system, the processor operable to:
assign the first email to a first one of a plurality of email queues in a first assignment, each of the plurality of email queues associated with at least one designated user-recipient, the at least one designated user-recipient having a skill set suitable for processing emails within the associated email queue;
generate and store, in response to a designated user-recipient associated with a first one of the plurality of email queues accessing the first email from the first one of the plurality of email queues and performing a first action related to the first email that is at least one of drafting and sending a reply to the first email, or resolving a request within the first email by docketing a deadline and sending a confirmation response email, a first historical data and associate the first historical data with the assignment of the first email to the first one of the plurality of email queues, the first historical data including an identification of a designated user-recipient associated with the first assignment to the first one of the plurality of email queues and an indication of an amount of time spent by the designated user-recipient associated with the first one of the plurality of email queues to perform the first action;

after assigning the first email to the first one of the plurality of email queues and in response to the designated user-recipient associated with the first one of the plurality of email queues accessing the first email from the first one of the plurality of email queues and performing the first action related to the first email, assign the first email to a second one of the plurality of email queues in a second assignment;

generate and store, in response to a designated user-recipient associated with a second one of the plurality of email queues accessing the first email from the second one of the plurality of email queues and performing the second action related to the first email that is different than the first action, a second historical data and associate the second historical data with the assignment of the first email to the second one of the plurality of email queues, the second historical data including an identification of a designated user-recipient associated with the second assignment to the second one of the plurality of email queues and an indication of an amount of time spent by the designated user-recipient associated with the second one of the plurality of email queues to perform the second action;

determine a first time interval, defined as the amount of time that the designated user-recipient associated with the first one of the plurality of email queues spent performing the first action based on the first historical data;

determine a second time interval, defined as the amount of time that the designated user-recipient associated with the second one of the plurality of email queues spent performing the second action on the first email based on the second historical data;

generate a bill for processing the first email, the bill including the first time interval, description of the first action, the second time interval, the description of the second action, and an identification code identifying a matter associated with the first email; and in response to a user request, display an email history of the first email, the email history describing sequential assignments to the plurality of email queues and including the first and second historical data in a chronological order.

18. The system in accordance with claim 17, wherein:
assignment of the first email to the first and the second ones of the plurality of email queues is performed according to a predetermined email process flow.

19. The system in accordance with claim 18, wherein:
the predetermined email process flow includes a set of customizable rules created by an email system administrator.

20. The system in accordance with claim 17, wherein the processor is further operable to:
re-assign the first email to an alternate designated user-recipient in response to an absence of an assigned designated user-recipient.

* * * * *